SELECTIVE CALLING SYSTEMS

INVENTORS
Thomas Theodore Brown
Leslie Raeburn Mullin
and
Gerald Ernest Selves
BY Baldwin, Wight, Diller & Brown
ATTORNEY Dec. 30, 1969 T. T. BROWN ET AL 3,487,367

SELECTIVE CALLING SYSTEMS

Filed Oct. 14, 1966 2 Sheets-Sheet 2

INVENTORS
Thomas Theodore Brown
Leslie Raeburn Mullin
and
Gerald Ernest Selves
BY Baldwin, Wight, Diller & Brown
ATTORNEY.

United States Patent Office 3,487,367
Patented Dec. 30, 1969

3,487,367
SELECTIVE CALLING SYSTEMS

Thomas Theodore Brown, Leslie Raeburn Mullin, and Gerald Ernest Selves, Essex, England, assignors to The Marconi Company Limited, London, England, a British company Filed Oct. 14, 1966, Ser. No. 586,699
Claims priority, application Great Britain, July 26, 1966, 44,558/66
Int. Cl. H04g 1/20, 1/45, 9/12
U.S. Cl. 340—164 7 Claims

ABSTRACT OF THE DISCLOSURE

A selective call responsive equipment having a testing circuit incorporated therein is described. The equipment includes a plurality of resonant devices, which may be vibratory reeds, respective to pre-determined frequencies. A warning signal is developed whenever all of the devices have responded. The test circuit includes an oscillator arrangement which is repeatedly swept across a frequency band which includes the pre-determined frequencies.

Figure 1:
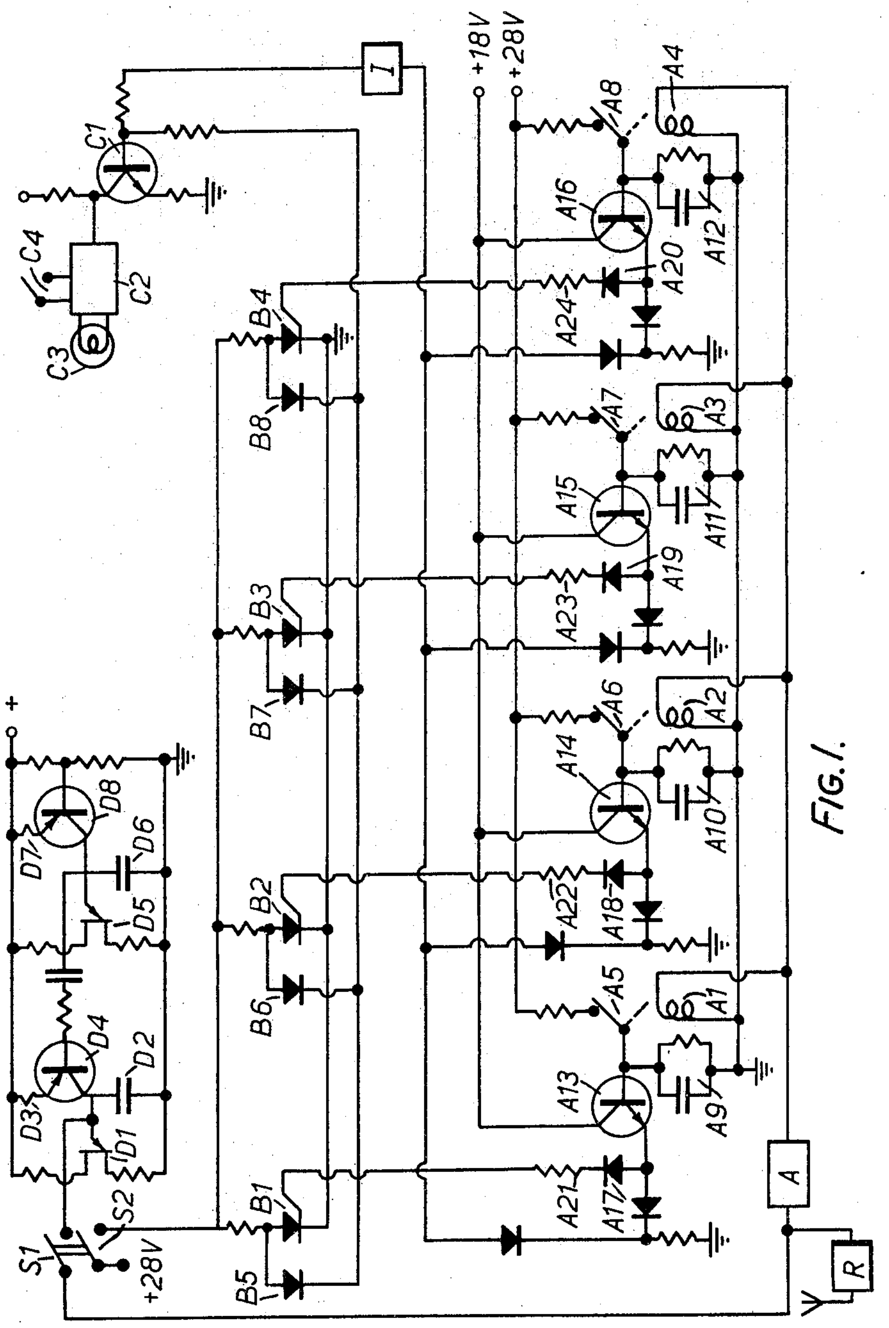

This invention relates to selective calling systems such as are used on aircraft though, of course, They may be used in other cases.

Pilot operated air-borne radio equipments are extensively employed at the present time and this has led to a need for selective calling systems which will relieve the pilot of the onerous necessity for aurally monitoring the radio channels normally employed so as not to miss messages intended for him. A selective calling system has accordingly been devised to give a particular pilot or operator warining that he is required to listen on one of his receivers. In this system the ground station requiring to communicate transmits a two-pulse code signal on a radio channel, each pulse containing two audio-frequency tones coded for the particular aircraft to be called. Different combinations of tones are used for each aircraft to be called, the said aircraft carrying a selective calling equipment which will selectively respond to a particular combination which has been allocated to it. In present practice a call comprises two audio tones simultaneously transmitted for 1 second followed after a pause of 0.2 sec. by another simultaneously transmitted combination of two audio tones, the tones being chosen from 12 pre-determined available tones. All calls are received by all aircraft in the calling network and each aircraft has a selective responder including four resonant reeds resonant at the four tone frequencies allocated to that aircraft. If two of these reeds respond to the two tones in the first pulse and the other two reeds respond to the two tones in the second pulse, a warning device (usually a flashing lamp) is energised and the pilot is thus informed that he is being called. The present invention seeks to provide improved aircraft or other selective calling equipment incorporating simple and economical means whereby the pilot may at any time test his calling equipment to ensure that it is operational. Obviously the provision of such testing means will reduce the risk that a pilot, who is not monitoring his communication channels aurally, will miss a message because his calling equipment is not functioning.

According to this invention a selective call responsive equipment wherein warning of a call is given by means including a plurality of resonant devices individually and selectively responsive to pre-determined frequencies within a pre-determined range of frequencies, warning being given when all said devices have resopnded, comprises means for generating an oscillation which is repeatedly swept in frequency over said range, means for applying said swept oscillation to all said devices, means actuated by response of each of said devices caused by sweeping of said swept oscillation across its resonant frequency, for triggering a controlled circuit from one state to another and means actuated when all said controlled circuits are triggered into said other state, for operating a warning device.

Preferably the swept oscillation generating means comprises two relaxation oscillators of which the first is dimensioned to oscillate at a frequency which is within the aforesaid range and is determined by the value of resistance in the charging circuit of the storage condenser of said oscillator and the second is dimensioned to oscillate at a pre-determined much lower frequency and is connected cyclically to vary the value of the resistance in the said charging circuit. In a preferred form of such oscillation generating means the first relaxation oscillator comprises a uni-junction transistor, a storage condenser and a charging circuit for said condenser including a resistance constituted by a transistor, and the second relaxation oscillator also comprises a uni-junction transistor, a storage condenser and a resistive charging circuit therefor, the voltage across the storage condenser in the second relaxation oscillator being applied as control voltage to control the resistance of the transistor in the charging circuit of the storage condenser in the first relaxation oscillator.

Preferably the resonant devices are resonant vibratory reeds operated by associated coils and each reed, when vibrating, intermittently closes a contact to apply potential from a D.C. source to a different one of a plurality of resistance-capacity integrating circuits, the potential across the capacity in each of said intergrating circuits being applied to the base of different one of a plurality of normally cut-off transistors each having an output electrode connected to apply triggering potential to a different one of a plurality of triggerable semi-conductor devices with each of which is associated a diode connected in a coincidence circuit, the arrangement being such that when all the transistors are rendered conductive by potential applied to their bases and all the triggerable devices are triggered, the coincidence circuit actuates a control transistor to cause actuation of the warning device. Preferably the triggerable devices are silicon controlled rectifiers.

Preferably there is provided a test switch device comprising two ganged switches one of which, when closed, feeds the swept oscillation to the coils of the vibratory reeds and the other of which, when closed, applies operating D.C. potential to the triggerable devices.

Preferably the warning device is a flashing electric lamp and the output from the second relaxation oscillator is also used to cause said lamp to flash.

Figure 2:
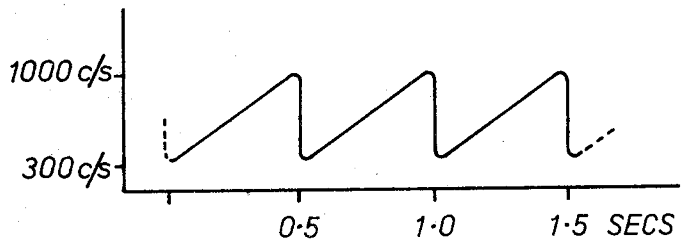

The invention is illustrated in the accompanying drawings in which FIGURE 1 is a simplified diagram of one embodiment and FIGURE 2 is an explanatory graphical figure.

Referring to FIGURE 1 which shows the call responding air-borne equipment, when the receiver R receives the calling tone combination appropriate to the aircraft in which the equipment of FIGURE 1 is mounted, i.e. when it receives simultaneously the first pair of selected audio tones followed by the second pair, these tones are fed to the energizing coils A1, A2, A3 and A4 of four tune reeds A5, A6, A7 and A8 respectively, setting them into vibration. Each of the reeds A5 and A6 is resonant to one or other of the two tones of the first pair and each of the reeds A7 and A8 is similarly resonant to one or other of the two tunes of the second pair. As already stated the first pair is transmitted for about 1 second and, after a pause of about .25 sec. the second pair is transmitted for a further period of about 1 sec.

The receipt of the first pair of tones accordingly sets the reeds A5 and A6 in vibration and the receipt of the second pair sets the reeds A7 and A8 in vibration. Each reed, when vibrating, intermittently makes contact as shown with a terminal at which a suitable voltage (e.g. of about 28 v.) is available and, accordingly, a charge is built up in the condenser of an associated resistance-capacity integrating circuit A9, A10, A11 or A12. The "live" terminals of the four integrating circuits are connected to the input side of an inverter transistor circuit in block I the output side of which is connected to the base of a control transistor C1 which is normally conductive. When the reeds have been vibrating for a sufficient time normally for about .5 sec.—the voltage set up across the four integrating circuits is sufficient to cut off the control transistor C1 and this actuates a relay circuit C2—it may actually include a relay but is preferably a semi-conductor device circuit operationally equivalent to a relay—which operates a warning device such as a flashing lamp C3. Receipt of the two successive pairs of tones which are appropriate to the receiver thus causes the lamp to flash, accordingly warning the operator that there is a call for him. The relay circuit C2 is of the self-maintaining type i.e. once actuated it remains in actuated condition until re-set by operation of a re-set switch represented at C4.

The foregoing described the operation of the apparatus when responding to a call in normal use i.e. when not testing. As so far described the apparatus is known. In normal use the two ganged switches S1 and S2 are open so that the only parts of the apparatus in effective operative use are those already described. It will be observed that response to a call requires the pairs of calling tones to be present for substantial times—ordinarily somewhere around .5 sec. to 1 sec. in each case—otherwise sufficient voltages are built up across the integrating circuits to cause the warning device to operate.

For test purposes the switches S1 and S2 are closed. The closure of the switch S1 causes a frequency swept oscillation as represented in FIGURE 2 to be applied through an amplifier A to the reed energising coils A1 to A4. This oscillation sweeps in frequency, in saw-tooth fashion, over rather more than the whole range of tone frequencies from which the calling tones are selected—as illustrated over a range of about 300 c./s. to 1000 c./s.—each sweep taking about .5 sec. This swept oscillation is obtained from a local generator unit consisting of two inter-connected relaxation oscillation generators. The first includes a uni-junction transistor D1. A condenser D2 charges at a rate determined by the charging resistance provided by a resistance D3 in series with a transistor D4. When the voltage across condenser D2 is sufficient to "fire" the uni-junction D1, the latter becomes conductive, the said condenser D2 is discharged and the cycle recommences, the said condenser again charging. This relaxation oscillator is a saw-tooth wave tone frequency oscillator the frequency of which is of a value between 300 c./s. and 1000 c./s. and is determined by the resistance offered by the transistor D4 in the condenser charging circuit. The value of this resistance is controlled by voltage across the condenser in the second relaxation oscillator which is connected in a similar circuit and comprises the uni-junction transistor D5, condenser D6 resistance D7 and transistor D8. The periodicity of this second relaxation oscillator is selected in accordance with the time of frequency sweep required. This time is not critical. In FIGURE 2 it is represented as being .5 sec. The swept oscillation produced by the combination of two relaxation oscillators is fed through switch S1, when closed, and amplifier A to the four coils A1 to A4. The reeds A5 to A8 are, as already stated, resonant at four different frequencies lying within the swept range of the swept oscillator. Accordingly, when the switch S1 is closed for testing, each of the four reeds will be subjected, during each sweep, to energisation as the swept frequency sweeps through its resonant frequency. Owing, however, to the transitory nature of such energisation, there is insufficient build-up of voltage in the integrating circuits to secure actuation of the relay circuit C2 and consequent operation of the lamp C3 in the same way as that in which such actuation is achieved when the reeds are set into vibration by relatively long application to their coils of frequencies in accord with their resonant frequencies, as happens (as already described) when the apparatus is in normal use as distinct from testing.

This difficulty is overcome by the additional circuitry now to be described. The "live" side of each integrating circuit A9, A10, A11 or A12 is connected to the base of a normally cut-off transistor A13, A14, A15 or A16. Each of these transistors is rendered conductive by voltage built up across the associated integrating circuit as a result of the intermittent energisation of the associated reed by the swept testing frequency. The emitter of each of the last mentioned transistors is connected through an isolating diode A17, A18, A19 or A20 in series with a resistance A21, A22, A23 or A24 to the control electrode of a silicon controlled rectifier (SCR) B1, B2, B3 or B4 and when any of the said transistors is rendered conductive the SCR connected thereto is also rendered conductive. Associated with each of the four rectifiers B1 to B4 is one of four diodes B5, B6, B7 or B8. These are connected as shown to constitute a co-incidence circuit, having their common junction point connected through a suitable resistance to the base of the control transistor C1. Accordingly, when all four SCR's are conductive the transistor C1 is cut off, the relay circuit C2 is actuated and the lamp C3 is energised, thus informing the operator that the system is in working order. It will be observed that when the system is in normal use, i.e. when testing is not being done, the circuitry including the four SCR's B1 to B4 and diodes B5 to B8 is out of action since the operating potential supply circuit therefor is opened at the switch S2. Also, of course, the circuit for the swept testing oscillation is open at S1.

The test equipment will not detect one theoretically possible fault, i.e. if one (or more) of the reeds is not resonant at its correct frequency, for the said equipment will indicate that the system is operative so long as all four reeds are resonant at frequencies in the range of the frequency swept test oscillation. However this theoretically possible fault is regarded so as unlikely to be present that the inability to detect it is not a defect from the practical point of view.

It will be observed that the extra equipment, over and above that ordinarily present in a known calling system, necessary for testing is small, compact, relatively inexpensive and, in the preferred illustrated embodiment, consists (ignoring the test switch S1, S2) entirely of semi-conductor devices and associated circuitry. Indeed the second relaxation oscillator (the one including the uni-junction D5) is ordinarily present in the calling system, being used for causing flashing of the lamp C3. The connections for so using this oscillator are not shown in the drawing since, of course, they are as at present known.

We claim:

1. A selective call responsive equipment wherein warning of a call is given by means including a plurality of resonant devices individually and selectively responsive to pre-determined frequencies within a pre-determined range of frequencies, warning being given when all said devices have responded, said equipment comprising means for generating an oscillation which is repeatedly swept in frequency over said range, means for applying said swept oscillation to all said devices, means actuated by response of each of said devices caused by sweeping of said swept oscillation across its resonant frequency, for triggering a controlled circuit from one state to another and means actuated when all said controlled circuits are triggered into said other state, for operating a warning device.

2. An equipment as claimed in claim 1 wherein the swept oscillation generating means comprises two relaxation oscillators of which the first is dimensioned to oscillate at a frequency which is within the aforesaid range and is determined by the value of resistance in the charging circuit of the storage condenser of said oscillator and the second is dimensioned to oscillate at a pre-determined much lower frequency and is connected cyclically to vary the value of the resistance in the said charging circuit.

3. An equipment as claimed in claim 1 wherein the resonant devices are resonant vibratory reeds operated by associated coils and each reed, when vibrating, intermittently closes a contact to apply potential from a D.C. source to a different one of a plurality of resistance-capacity integrating circuits, the potential across the capacity in each of said integrating circuits being applied to the base of different one of a plurality of normally cut-off transistors each having an output electrode connected to apply triggering potential to a different one of a plurality of triggerable semi-conductor devices with each of which is associated a diode connected in a coincidence circuit, the arrangement being such that when all the transistors are rendered conductive by potential applied to their bases and all the triggerable devices are triggered, the coincidence circuit actuates a control transistor to cause actuation of the warning device.

4. An equipment as claimed in claim 2 wherein the first relaxation oscillator comprises a uni-junction transistor, a storage condenser and a charging circuit for said condenser including a resistance constituted by a transistor, and the second relaxation oscillator also comprises a uni-junction transistor, a storage condenser and a resistive charging circuit therefor, the voltage across the storage condenser in the second relaxation oscillator being applied as control voltage to control the resistance of the transistor in the charging circuit of the storage condenser in the first relaxation oscillator.

5. An equipment as claimed in claim 2 wherein the warning device is a flashing electric lamp and the output from the second relaxation oscillator is also used to cause said lamp to flash.

6. An equipment as claimed in claim 3 wherein the triggerable devices are silicon controlled rectifiers.

7. An equipment as claimed in claim 3 wherein there is provided a test switch device comprising two ganged switches one of which, when closed, feeds the swept oscillation to the coils of the vibratory reeds and the other of which, when closed, applies operating D.C. potential to the triggerable devices.

References Cited

UNITED STATES PATENTS

| | | | |
|---|---|---|---|
| 2,837,636 | 6/1958 | Richard | 325—363 |
| 3,039,081 | 6/1962 | Smith | 340—171 |
| 3,195,132 | 7/1965 | Battle et al. | 325—363 XR |
| 3,345,628 | 10/1967 | Jackson | 340—171 XR |
| 3,353,181 | 11/1967 | Preuss | 325—363 XR |
| 3,399,381 | 8/1968 | Jackson | 340—171 |

DONALD J. YUSKO, Primary Examiner

U.S. Cl. X.R.

325—363